United States Patent [19]

Neumann

[11] Patent Number: 5,035,551
[45] Date of Patent: Jul. 30, 1991

[54] METHOD, CHUCK AND ROTARY TOOL TO BE USED WHEN MAKING A HOLE IN A WORKPIECE

[75] Inventor: Harald P. G. Neumann, Julita, Sweden

[73] Assignee: Tryckluftteknik Harald Neumann AB, Julita, Sweden

[21] Appl. No.: 784,715

[22] Filed: Oct. 4, 1985

Related U.S. Application Data

[60] Division of Ser. No. 674,341, Nov. 16, 1984, Pat. No. 4,589,310, which is a continuation of Ser. No. 304,551, Sep. 21, 1981, abandoned.

[51] Int. Cl.⁵ .............................................. B23B 51/10
[52] U.S. Cl. .................................... 408/224; 408/225; 408/230; 408/241 R
[58] Field of Search ................. 408/224, 225, 241 R, 408/230

[56] References Cited

U.S. PATENT DOCUMENTS 1,471,866  10/1923  Simpson ............................. 408/224
3,237,488  3/1966   Parone et al. ....................... 408/230
4,312,610  1/1982   Burt .................................... 408/26

FOREIGN PATENT DOCUMENTS 373096  3/1973  U.S.S.R. .............................. 408/73

Primary Examiner—Hien H. Phan
Attorney, Agent, or Firm—Young & Thompson

[57] ABSTRACT

For drilling a hole and machining at least its opening end without changing tools, a through-hole is drilled using a special tool, and then the same tool is moved sideways by means of a special chuck which guides the tool during machining of the drilled hole. The chuck has a locking means which when engaged holds it in a drilling position and which when disengaged allows sideways motion of a tool mounted in the chuck. The longitudinal section of the tool used, to be located within the hole during the machining operation, is situated within a curved surface having a radius just as great as that of the drill and having its center of curvature on the line about which the tool rotates during drilling.

2 Claims, 2 Drawing Sheets

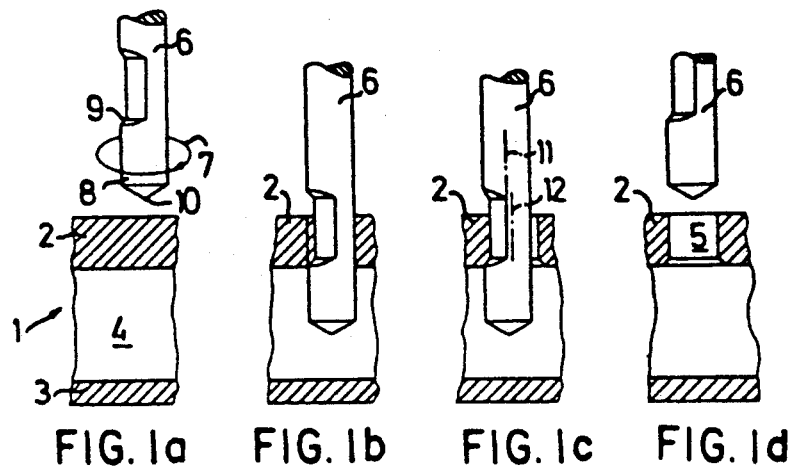
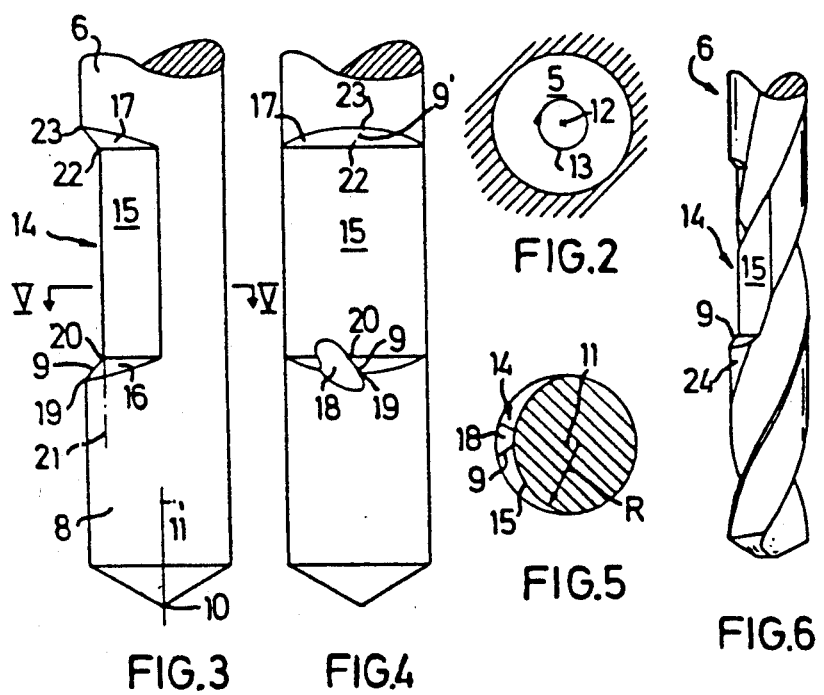

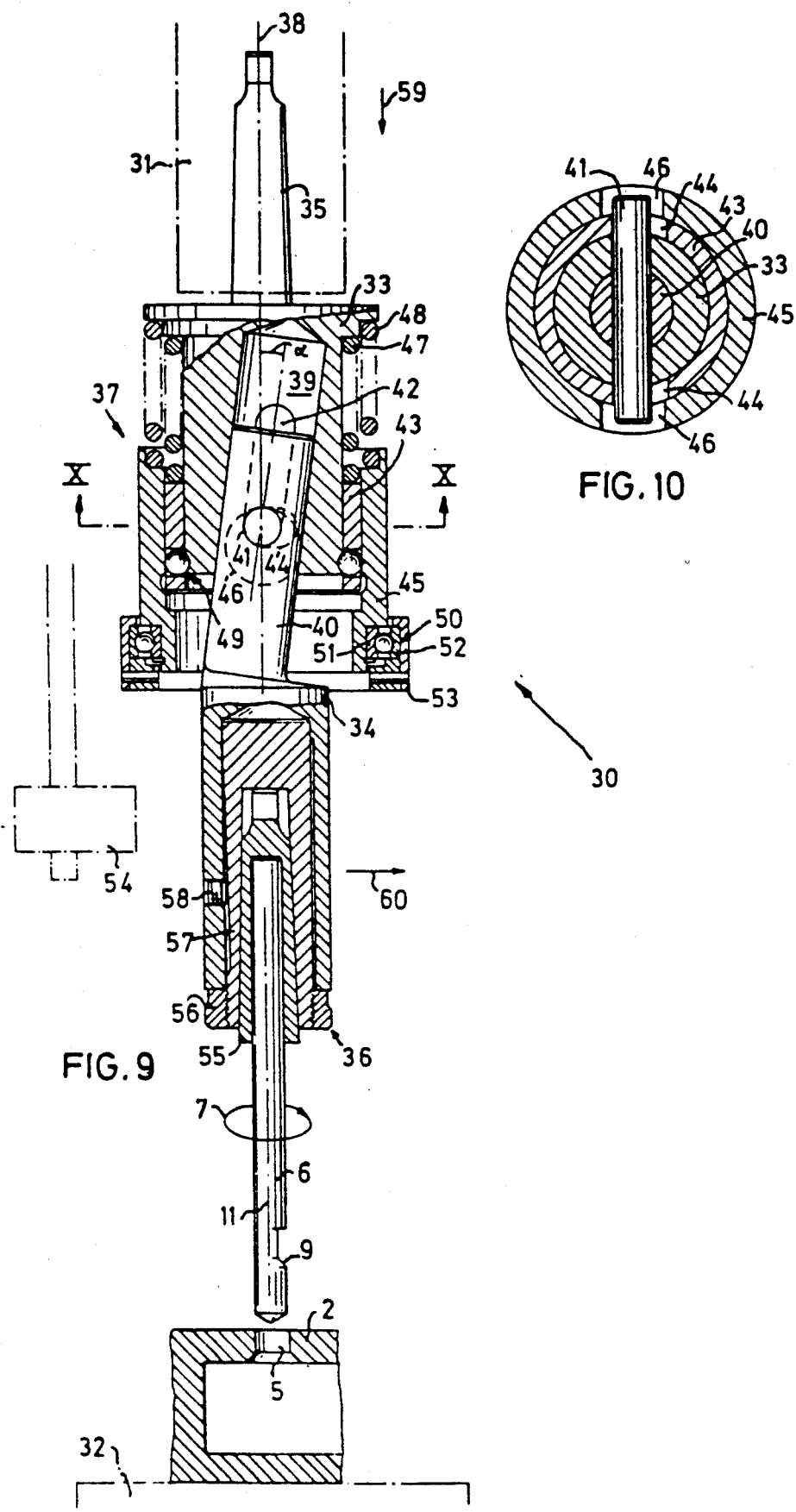

METHOD, CHUCK AND ROTARY TOOL TO BE USED WHEN MAKING A HOLE IN A WORKPIECE

This application is a division of application Ser. No. 674,341, filed 11/16/84, now U.S. Pat. No. 4,589,310 which is a continuation of Ser. No. 304,551 filed 9/21/81 and now abandoned. The invention relates to a method of machining a workpiece where a through-hole is first bored by means of a rotary tool, whereafter the tool during continued rotation is caused to machine at least the hole edge situated on the side of the workpiece which, before starting boring, is facing away from the rotary tool. The invention also relates to a chuck for carrying out the method, and to a rotary tool for use with the chuck.

In conjunction with boring a through-hole in a workpiece it is often desirable, for example, to deburr the hole edges on one or both sides of the workpiece. This causes no problems when both sides of it are easily accessible. However, the situation is different when one side of the workpiece is inaccessible, e.g. it forms the defining wall in a duct and cannot be deburred in a conventional manner. Special, time-consuming and complicated deburring methods must therefore often be used.

It is already known, through U.S. Pat. No. 1,471,866, to perform in a single operation drilling of a hole and subsequent machining of one of the edges of the hole by using a special tool. Said tool is provided with a special guide portion for guiding the tool in the hole during the machining operation. In order to displace the tool radially it is necessary to also displace the tool axially. As a result, the precision of the tool movement is not very good.

In U.S. Pat. Nos. 2,848,912, 2,945,404 and 3,299,749 there are disclosed various chucks where axial motion of part of the chuck causes radial motion for a part of the chuck holding a tool. These chucks are intended to enable provision of grooves or chamfers in the wall of a previously drilled hole. Drilling is not feasible with these chuncks.

The object of the invention is to eliminate said disadvantages and to provide a new and improved method of making a through-hole in a workpiece. Another object of the invention is to provide suitable equipment enabling performance of the new method.

The new method in accordance with the invention is characterized in that after terminated boring, the tool is arrested axially in a predetermined position relative the workpiece by means of a chuck settable between a boring position and a machining position, whereafter the rotary tool is taken radially outwards by the chuck into controlled rotation about the rotational axis of the chuck for machining, the tool being retained in the machining position solely by means of the chuck.

In a chuck for carrying out the method, a first member of two members incorporated in the chuck is provided with a guide recess for a guide shank on the second member, axially displaceable in the guide recess and at an angle to the rotational axis of the chuck, said second member having a holder for a rotary tool and being coupled to a contact means by means of which it can be arrested in a predetermined axial position relative the workpiece which is to be machined, for causing via axial displacement of the first member a radial displacement outwards of the holder. According to the invention, the second member is lockable relative the first member by means of a locking means in a normal position for boring, where the centreline of a rotary tool in the holder coincides with the rotational axis of the chuck, and the locking means is resettable by means of the contact means to a position out of engagement where relative displacement between the first member and the second member is possible.

According to the invention, the entire longitudinal section of the tool which is intended during machining to be in the hole bored by the tool, is situated within or at most touching a cylindrical surface having its centre on the line about which the tool is intended to rotate during drilling, and having a radius just as great as that of the drill. Preferably, the tool is formed as a twist drill.

Thus, according to the invention simplified operation is possible while at the same time providing better precision than before.

Further characterizing features of the invention will be seen from the claims.

The invention will now be described in detail in the following whit the aid of the embodiment examples illustrated in the appended drawing, where FIG. 1a–d illustrates different steps in a hole-machining operation in accordance with the invention, FIG. 2 schematically illustrates the path of motion of the central axis of a hole-machining tool in hole-machining according to the invention, FIG. 3 is a side view of a tool in accordance with the invention, FIG. 4 is a front view of the tool in FIG. 3, FIG. 5 is a section along the V—V in FIG. 3, FIG. 6 is a twist drill modified into a hole-machining tool in accordance with the invention, FIGS. 7 and 8 show different detail embodiments of a tool similar to the one in FIG. 3, FIG. 9 illustrates a chuck in accordance with the invention, and FIG. 10 illustrates a section along the line X—X in FIG. 9.

In FIG. 1, a detail 1 is made with double walls 2 and 3 between which there is a space 4. The upper wall 2 forms a workpiece which is to be provided with a through-hole 5. The intention is further to deburr the hole 5 on the side of the piece 2 facing towards the space 4, and which is thus not easily accessible. A hole-machining tool 6 in accordance with the invention is utilized to achieve this, and is caused to rotate in the direction of the arrow 7. Since the forward and 8 is formed as a drill, the piece 2 can be bored, as will be seen from FIG. 1b. A machining means 9, adapted on the tool 6 at a given distance from the tip 10 of the forward end, has been placed, also in FIG. 1b, level with the side of the piece 2 where machining is desired. From the position illustrated in FIG. 1b, the tool 6 is gradually moved into the position shown in FIG. 1c where the tool is no longer concentric with the hole 5, and where the centreline 11 of the tool 6 moves in a path round the centreline 12 of the hole. This motion is illustrated in FIG. 2, where the centreline 11 of the tool describes a circular path 13 with its centre at the centreline 12 of the hole. Simultaneously as the centreline 11 of the tool completes a revolution in its path 13, the machining means 9 also completes a revolution along the periphery of the hole 5, i.e. the tool 6 is in controlled rotation in a path about the centreline 12 of the hole. During movement of the tool 6 from the position shown in FIG. 1b to that shown in FIG. 1c, the radius of the path 13 will initially be very small, to increase gradually to a final value determined by the hole size and by how the tool 6 is formed. After carrying out desired hole-maching, e.g. deburring or counter-sinking, the tool 6 is once again centered with the hole 5 and removed from the workpiece, as will be seen from FIG. 1d.

FIGS. 3-5 illustrate in detail how the tool 6 of FIG. 1 is formed. The machining means 9 is in this case formed as a cutting edge facing away from the tip 10. In order to clarify the inventive concept simply, the tool 6 is shown as a substantially circular cylindrical body, but different variations of this form can naturally occur. Along a portion of its length, the tool 6 is provided with a recess 14 extending round a section of the tool periphery. The tool 6 has a cylindrical surface 15 limiting the recess 14, and which has a radius of curvature R (see FIG. 5) which can be at most equal to the radius of the hole 5 which is to be machined. Below the surface 15 there is a bevel 16 forming a junction between the surface 15 and the periphery of the tool 6. A corresponding bevel 17 is situated above the surface 15. In the bevel 16 there is a depression 18 defining the machining means 9, which can be formed as a cutting edge intended to operate in the rotational direction indicated by the arrow 7 in FIG. 1a. The means 9 is suitably situated substantially where the bevel 16 has its greatest width, i.e. in the area where the recess 14 is deepest. The extension of the recess 14 in the lengthwise direction of the tool is dependent on the thickness of the piece to be machined. If the extension of the recess is insufficient it will not be possible to move the tool 6 to one side so that the desired controlled rotation about the centreline 12 of the hole can be carried out.

The means 9 extends from a first place 19 on the periphery of the tool 6 to a second place 20 inwards of the tool periphery, the means facing away from the tip 10, as already mentioned, the second place 20 being situated at least as far as the first place 19 from the tip 10. The orientation of the means 9 in the illustrated example is further such that the second place 20, seen in the rotational direction according to arrow 7, is in front of the first place 19. Naturally, it is also possible to let the first place 19 be in front of the second place 20. As will be seen from FIG. 3, a line 21, parallel to the centreline 11 and passing through the second place 20, will restrict the radial extension of the tool 6 at the recess 14 in a direction towards the operation means 9.

The tool 6 may possibly be provided with a further machining means 9' (FIG. 4) situated at the upper bevel 17. This means then extends from a third place 22, situated at substantially the same radial distance from the centreline 11 of the tool 6 as the second place 20, to a fourth place 23 situated further out from the centreline 11, this place being at least as far from the top 10 as the third place 22. By suitable selection of the mutual spacing between machining means 9 andd 9', both sides of a piece 2 can be machined in one and the same operation, or also, for an increase in the spacing between the means 9 and 9', either one of the sides of the piece can be machined, depending on how far the tool 6 is entered into the hole before lateral displacement of the tool is started. One possibility is naturally also to form the tool with only a means 9' facing towards the tip 10.

A particularly advantageous embodiment of a hole-machining tool 6 in accordance with the invention is shown in FIG. 6, where a standard type of twist drill is ground for use as a deburring drill. The machining means 9, formed as a cutting edge, is placed in conjunction to one of the clearance surfaces 24 of the drill. A possible machining means 9' with the orientation shown in FIG. 4 must similarly be arranged in conjunction to a clearance surfce and can therefore only be placed at certain given distances from the means 9, due to the drill geometry. A hole-machining tool formed in this manner can to advantate be used for both drilling a hole and in direct connection therewith to deburr one side of the workpiece, for example. If so desired, it is however naturally possible to utilize the tool solely for deburring a hole already bored.

In the embodiment shown in FIGS. 3 and 6, the machining means 9 is substantially straight between both its end points and forms an angle of about 45° to the centreline 11 of the tool 6. Depending on what type of machining it is desired to achieve, the machining means 9 can naturally be formed and oriented otherwise. Some examples hereon are shown in FIGS. 7 and 8. According to FIG. 7, the machining means 9 may be curved between both its end points and have a concave form (full line) or convex form (dashed line). Instead, if it is desired to make a flat recess for example, the means 9 may be formed and placed as illustrated in FIG. 8, where it forms a substantially right angle to the centreline 11 of the tool 6. This correspondingly also applies for a means 9' according to FIG. 4. The forward end 8 of the tool 6 can, as already described, be formed as a twist drill for making holes. However, the forward end 8 may also be formed as a thread tap or milling cutter, for example, or it may be given a solely guiding function for an already drilled hole. From the point of view of machining, large advantages are gained if the forward end 8 is also utilized for machining, e.g. drilling.

Special equipment is required in order to use a tool 6 in accordance with the invention. A chuck 30 is therefore shown in FIG. 9 for retaining a tool 6 in accordance with the invention, and is intended for fitting in a mandrel 31, e.g. in a drilling machine provided with feed mechanism, or the like, on the table 32 of which the workpiece 2 can be placed for machining. The chuck 30 includes a first member 33 and a second member 34 unrotatably connected thereto. The first member 33 is provided with a conventional shank 35 for fixing in the mandrel 31, and the second member 34 is provided with a holder 36 for the tool 6.

In the position shown in the drawing, the normal position, the first member 33 and the second member 34 are mutually locked with the aid of a locking means 37, and the relative position of the members is such that the centreline 11 of the tool 6 coincides with the rotational axis 38 of the chuck 30.

The first member 33 is provided with a guide recess 39 for a guide shank 40 on the second member 34. In the guide shank 40 there is fitted a cross pin 41 which, on axial displacement of the guide shank 40 in the recess 39, runs in two opposing slots 42 in the first member 33. The cross pin 41 and slots 42 provide a non-rotating connection between the first member 33 and the second member 34, simultaneously as the possible relative movement between these two parts is restricted.

An inner sleeve 43, which is incorporated in the locking means 37 and axially displaceable on the first member 33, is provided with slots 44 oriented substantially at right angles to the longitudinal direction of the sleeve and formed to mate with the end portions of the cross pin 41. Outside the inner sleeve 43 there is an outer sleeve 45 which is axially displaceable relative to both the inner sleeve 43 and the first member 33. The outer sleeve 45 is provided with recesses 46 for the end portions of the cross pin 41, and is thereby limitedly axially displaceable relative the inner sleeve 43. A helical spring 47 bearing against the first member 33 urges the inner sleeve 43 downwards, and similarly, a helical spring 48 bearing against the first member 33 urges the outer sleeve 45 downwards. The inner sleeve 43 constitutes a holder for a latching mechanism 49 coacting with the first member 33 and the outer sleeve 45, this mechanism suitably being of the ball type and having the task of locking the first member 33 and second member 34 in the relative position illustrated in FIG. 9.

At the lower end of the outer sleeve 45 there is mounted a bearing 50, the inner ring 51 of which is fixed relative the outer sleeve 45. The outer ring 52 of the bearing 50 constitutes an attachment for a contact means 53 which is rotatable relative the outer sleeve 45 and intended to be brought into contact with a stop 54, this stop being fixed relative the workpiece 2 and mounted on the machine in which the chuck 30 is operating. In certain situations it can possibly be advantageous to mount the stop 54 directly on the workpiece 2, for reasons which will be apparent hereinafter.

The tool 6 is kept in the holder 36 with the aid of a clamping sleeve 55 which is inserted in a positioning sleeve 57 provided with a threaded-on positioning ring 56, the positioning sleeve 57 being in turn fixable by means of a set screw 58. This arrangement allows rapid and simple changing of tools in the holder 36. By setting the positioning ring 56 and the positioning sleeve 57 in a given, mutually relative position beforehand, it is possible to predetermine at what spacing from the underside of the holder 36 a machining means 9 shall be placed. When fitting a tool 6 in the holder 36 it is essential that the machining means 9 is oriented so that it is facing the direction to which the second member 34 will move laterally when the guide shank 40 thrusts into the guide recess 39.

The chuck 30 functions in the following manner: In the position illustrated in FIG. 9, the first member 33 and second member 34 are mutually locked with the aid of the locking means 37, and the rotational axis 38 then coincides with the centreline 11 of the hole-machining tool 6. The chuck 30 now functions as a customary drill chuck and can naturally be used as such. When the mandrel 31 is moved downwards in the direction of the arrow 59, the tool 6 will be fed downwards to begin with as well, e.g. so that drilling a hole 5 can be performed. The stop 54 has previously been set at such a height that its upper side will come into contact with the contact means 53 when the machining means 9 on the tool 6 is substantially at the same height as the side on the workpiece 2 which is to be machined (in this case the underside). When the contact means 53 comes into contact with the stop 54, the downward movement of the outer sleeve 45 will be arrested, although the outer sleeve can continue to rotate. The first member 33 together with the inner sleeve 43 thereafter continues downwards to the position where the latching mechanism 49 goes out of engagement, whereby the lock between the first member 33 and the second member 34 ceases. With the aid of the stop 54 and the outer sleeve 45, as well as the inner sleeve 43 and the cross pin 41, the second member 34 is prevented from continuing its downward movement. Instead, the first member 33 and the second member 34 will be telescoped together during continued feed of the mandrel 31, as a consequence of the guide shank 40 now being able to thrust into the guide recess 39. The first member 34 will thereby move in the direction of the arrow 60, i.e. in a direction at right angles to the rotational axis 38. The magnitude of this movement of the second member 34 is restricted by the length of the slots 44 or in some other suitable way, e.g. with the aid of a stop limiting the vertical movement of the mandrel 31. The tool 6 can thus be hereby caused to carry out a controlled rotation in a path about the rotational axis 38, i.e. about the centreline of the hole 5.

When the desired hole-machining has been carried out, return feed of the mandrel 31 is begun, resulting in that the first member 33 and the second member 34 are once again moved apart, whereby the tool 6 is gradually returned to a position central with that of the roatational axis 38. Continued return feed of the mandrel 31 results in that the lock between the first member 33 and the second member 34 is once again accomplished and all the parts assume the normal position illustrated in FIG. 9.

The chuck 30 can naturally be modified in different respects. In the examples shown here, unrotatable connection between the first member 33 and the second member 34 is obtained with the aid of the cross pin 41 and the slots 42, but it is naturally also possbile to form the guide shank 40 and the guide recess 39 in a manner such that mutual angular movement between the parts is inhibited, e.g. with the aid of splines or the like. It may also be necessary to place a spring between the first member 33 and the second member 34 to move them apart.

What I Claim Is:

1. A twist drill bit having helical clearance surfaces and a centrla axis and a forward end, for use with a chuck, there being a recess spaced from said forward end of the drill, said helical clearance surfaces extending on both sides of said recess lengthwise of said axis, said drill bit being of uniform overall cross-section except at said recess. said recess extending about a portion of the drill bit periphery, said recess extending along a portion of the drill bit length, there being arranged at least at an end of the recess situated nearest said forward end a fixed cutting edge that extends from a said clearance surface to the bottom of said recess in a direction away from said forward end and at an acute angle to said axis of the drill bit, thereby when the drill bit has been brought into controlled revolution about a centerline of a hole bored through a workpiece, said revolution being such that in revolution said central axis forms a surface of an imaginary cylinder, said drill bit also rotating on its central axis, the cutting edge provides chamfering of the hole edge which is situated on that side of said workpiece which faces away from the drill bit before starting boring, the entire longitudinal section of the drill bit, which is intended during chamfering to be within the hole bored by the drill, and including the longitudinal section of the drill beyond both ends of said recess, being situated within, or at most touching an imaginary cylindrical surface having its center on said axis, said cylindrical surface having a radius equal to that of the drill bit.

2. A twist drill as claimed in claim 1, and at the end of the recess farthest from said end of the drill, a further cutting edge facing toward the first-mentioned cutting edge.

* * * * *